(12) United States Patent
Vahdat et al.

(10) Patent No.: US 11,246,173 B2
(45) Date of Patent: Feb. 8, 2022

(54) SYSTEMS AND METHODS FOR MULTI-USER PAIRING IN WIRELESS COMMUNICATION NETWORKS

(71) Applicants: Ali Vahdat, Toronto (CA); Timmy Rong Tian Tse, Montreal (CA)

(72) Inventors: Ali Vahdat, Toronto (CA); Timmy Rong Tian Tse, Montreal (CA)

(73) Assignee: Huawei Technologies Co. Ltd., Shenzhen (CN)

(*) Notice: Subject to any disclaimer, the term of this patent is extended or adjusted under 35 U.S.C. 154(b) by 266 days.

(21) Appl. No.: 16/678,797

(22) Filed: Nov. 8, 2019

(65) Prior Publication Data

US 2021/0144779 A1 May 13, 2021

(51) Int. Cl.
| | |
|---|---|
| *H04W 76/10* | (2018.01) |
| *H04W 72/04* | (2009.01) |
| *H04W 24/02* | (2009.01) |
| *G06N 3/04* | (2006.01) |
| *H04B 7/06* | (2006.01) |
| *G06N 3/08* | (2006.01) |

(52) U.S. Cl.
CPC .......... *H04W 76/10* (2018.02); *G06N 3/04* (2013.01); *G06N 3/08* (2013.01); *H04B 7/0626* (2013.01); *H04W 24/02* (2013.01); *H04W 72/044* (2013.01)

(58) Field of Classification Search
CPC ... H04W 76/10; H04W 24/02; H04W 72/044; G06N 3/04; G06N 3/08; H04B 7/0626
See application file for complete search history.

(56) References Cited

U.S. PATENT DOCUMENTS

2016/0134351 A1* 5/2016 Choi ................ H04W 72/0413
370/328
2018/0341860 A1 11/2018 Shazeer et al.

FOREIGN PATENT DOCUMENTS

| CN | 108566255 A | * | 9/2018 |
|---|---|---|---|
| CN | 108737057 A | | 11/2018 |
| CN | 109474980 A | | 3/2019 |

(Continued)

OTHER PUBLICATIONS

Dzmitry Bahdanau et al.; Neural Machine Translation by Jointly Learning to Align and Translate; Published as a conference paper at ICLR 2015 2015.

(Continued)

*Primary Examiner* — Joshua L Schwartz

(57) ABSTRACT

Multi-user pairing of a plurality of wireless devices refers to the selection of different devices for simultaneously sharing a frequency band during a shared time interval. A method for performing wireless multi-user pairing of a plurality of user equipment (UE) is performed using a neural network model for a wireless communication network. The method includes: receiving channel state information (CSI) between each UE of a plurality of UEs and a base station with a plurality of antennas in the wireless communication network; converting the UE CSIs to an input sequence; and inputting the input sequence to system implementing the neural network model, the neural network model configured to generate pairing information for each UE based on the input sequence, the pairing information for each UE indicative of whether the UE is to share a frequency resource during a shared time interval.

18 Claims, 12 Drawing Sheets

(56) References Cited

FOREIGN PATENT DOCUMENTS

WO    2017000193 A1    1/2017

OTHER PUBLICATIONS

Bin Fan et al.; Spatial Multi-user Pairing for Uplink Virtual-MIMO Systems with Linear Receiver; This full text paper was peer reviewed at the direction of IEEE Communications Society subject matter experts for publication in the WCNC 2009 proceedings 2009.

Jiancun Fan et al.; Joint User Pairing and Resource Allocation for LTE Uplink Transmission; IEEE Transactions on Wireless Communications, vol. 11, No. 8, Aug. 2012 2012.

Zhao Hongzhi et al.; A Suboptimal Multiuser-Pairing Algorithm With Low Complexity for Virtual MIMO Systems; IEEE Transactions on Vehicular Technology, vol. 63, No. 7, Sep. 2014 2014.

Boqi Jia et al.; Joint User Pairing and Power Allocation in Virtual MIMO Systems; IEEE Transactions on Wireless Communications, vol. 17, No. 6, Jun. 2018 2018.

Chunxiao Jiang et al.; Machine Learning Paradigms for Next-Generation Wireless Networks; IEEE Wireless Communications; Accepted for Publication, 2016 IEEE 2016.

Aldebaro Klautau et al.; 5G MIMO Data for Machine Learning: Application to Beam-Selection using Deep Learning; In Information Theory and Applications Workshop (ITA) 2018 2018.

Hugo Larochelle at al.; Learning to combine foveal glimpses with a third-order Boltzmann machine; Advances in neural information processing systems 2010 2010.

Michael A. Ruder et al.; Combined User Pairing and Spectrum Allocation for Multiuser SC-FDMA Transmission; This full text paper was peer reviewed at the direction of IEEE Communications Society subject matter experts for publication in the IEEE ICC 2011 proceedings 2011.

Ashish Vaswani et al.; Attention Is All You Need; 31st Conference on Neural Information Processing Systems (NIPS 2017), Long Beach, CA, USA. 2017.

Emanuele Viterbo et al.; Optimal user pairing for multiuser MIMO; IEEE 2008 2008.

Xiaozhou Zhang et al.; Uplink and Downlink User Pairing in Full-Duplex Multi-User Systems: Complexity and Algorithms; 2017 IEEE 2017.

Ma, Manyou et al. Joint User Pairing and Association for Multicell NOMA: A Pointer Network-Based Approach, 2020 IEEE International Conference on Communications Workshops (ICC Workshops) Jul. 21, 2020, total 6 pages. 2020.

Zhu, Lipeng et al. Optimal User Pairing for Downlink Non-Orthogonal Multiple Access (NOMA), IEEE Wireless Communications Letters, vol. 8, No. 2, Apr. 2019, pp. 328-331. 2019.

Shaoyang Wang et al. Multi-Agent Reinforcement Learning-Based User Pairing in Multi-Carrier NOMA Systems, 2019 IEEE, total 6 pages. 2019.

Antonino Masaracchia et al. A PSO-Based Approach for User-Pairing Schemes in NOMA Systems: Theory and Applications, IEEE Access Jul. 24, 2019, pp. 90550-90564. 2019.

\* cited by examiner

Table 1

Ratio = $C^A / C^G$

| User count | $d_{model}$ | Noise=0.0 | Noise=0.2 | Noise=0.5 |
|---|---|---|---|---|
| 10 | 64 | 93.70 (100.00) | 93.96 (103.95) | 94.20 (105.94) |
| | 128 | 93.11 (100.40) | 93.51 (104.70) | 94.22 (105.27) |
| | 256 | 93.69 (100.00) | 93.95 (104.58) | 94.22 (105.27) |
| 20 | 64 | 84.40 (100.40) | 87.64 (112.52) | 93.50 (136.86) |
| | 128 | 82.69 (102.70) | 92.64 (118.71) | 96.89 (142.27) |
| | 256 | 89.24 (103.91) | 89.01 (112.55) | 100.32 (144.56) |

FIG. 7

Table 2

Ratio = $C^A / C^G$

| User count | Weight precision | Noise=0.0 | Noise=0.2 | Noise=0.5 | Noise=1.0 |
|---|---|---|---|---|---|
| 10 | 32 bits | 93.68 (100.00) | 93.74 (104.33) | 94.11 (105.33) | 94.15 (105.30) |
| | 16 bits | 93.64 (100.00) | 93.94 (104.27) | 94.17 (105.49) | 94.21 (105.36) |
| | 8 bits | 93.70 (100.00) | 93.85 (103.96) | 94.20 (105.27) | 94.24 (105.27) |
| 20 | 32 bits | 86.22 (101.20) | 83.97 (105.42) | 91.22 (132.56) | 105.21 (147.05) |
| | 16 bits | 83.56 (100.71) | 84.50 (105.67) | 96.26 (141.15) | 108.18 (158.30) |
| | 8 bits | 88.25 (103.14) | 86.09 (112.59) | 93.52 (144.64) | 109.86 (155.41) |

FIG. 8

SYSTEMS AND METHODS FOR MULTI-USER PAIRING IN WIRELESS COMMUNICATION NETWORKS

TECHNICAL FIELD

Example embodiments relate to wireless communications, in particular systems and methods for multi-user pairing in wireless communications networks.

BACKGROUND

With increasing numbers of user equipment (UE) requiring access to wireless networks, and with limited available frequency bands, advanced radio resource management techniques are required.

A base station (BS), such as a enB in Long-Term Evolution (LTE) wireless communication networks or a gNB in 5G wireless communication networks, can allocate frequency resources for communication with multiple UEs in time domain and frequency domain. A base station can also multiplex communications with multiple UEs in spatial domain (i.e., space dimension), for example, using different antennas to service different UEs. When the base station allocates the same frequency resource to different UEs for simultaneous communication using different antennas, those UEs are referred to as paired UEs. Because there can be interference between UEs communicating using the same frequency resource, it is desired for the base station to select the appropriate UEs to be paired to share that frequency resource.

A difficulty with selecting which UEs to pair is that the decision is to be made in real-time and optimization calculations can be complex. For example, calculating of all of the various permutations of pairing UEs is not efficient or practical with limited processing power and real-time requirements.

Accordingly, it would be desirable to provide an efficient and effective solution for pairing UEs to communicate with a BS over a shared frequency resource.

SUMMARY

Example embodiments relate to systems and methods for pairing UEs to communicate with a BS using a shared frequency band.

Wireless pairing of a plurality of UEs refers to the selection of different devices for simultaneously sharing a frequency resource for communications during a shared time interval. The shared time interval is a time interval, such as a Transmission Time Interval (TTI) in Universal Mobile Telecommunications Service (UMTS), in which multiple UEs use the same frequency resource (by sending or receiving data over that frequency resource). An example embodiment is a method for performing wireless multi-user pairing of a plurality of user equipment (UE) performed by a base station having a plurality of antennas, or antenna ports.

An example embodiment is a method for performing multi-user pairing of a plurality of user equipments (UEs) using a neural network model for a wireless communication network. The method includes: receiving an input comprising a sequence channel state information (CSI) vectors, each CSI vector comprising CSI between each UE of a plurality of UEs and a base station with a plurality of antennas in the wireless communication network; transforming the input to an input embedding; and inputting the input embedding to system implementing the neural network model, the neural network model configured to generate pairing information for each UE based on the input embedding, the pairing information for each UE indicative of whether the UE is to share a frequency resource during a shared time interval.

In another example embodiment of any of the above, the neural network model is trained using a training dataset comprising labeled data samples, wherein each labeled data sample is a $<x, y>$ pair, with x representing a measured or simulated CSI between a UE of the plurality of UEs and the plurality of antennas of the base station and y representing the pairing information for the UE.

In another example embodiment of any of the above, wherein the pairing information for the UE is generated using a greedy algorithm.

In another example embodiment of any of the above, the neural network model optimizes network capacity of the wireless communication network.

In another example embodiment of any of the above, the neural network model optimizes signal to interference plus noise ratio (SINR) or signal to noise ratio (SNR) of the wireless communication network.

In another example embodiment of any of the above, the neural network model further includes an encoder for transforming the input embedding to vectors in the latent space.

In another example embodiment of any of the above, the neural network model further includes a decoder that includes a feed forward neural network for transforming the vectors in the latent space to a decoder output.

In another example embodiment of any of the above, the neural network model further includes a transformation module for transforming the decoder output to a transformed output.

In another example embodiment of any of the above, the neural network model further includes a sigmoid module for transforming the transformed output to the pairing information, wherein the pairing information is a vector having binary values representative of being paired versus unpaired.

In another example embodiment of any of the above, the encoder includes a plurality of parallel attention mechanisms.

In another example embodiment of any of the above, the encoder is configured to concatenate collective output from each attention mechanism and transform the concatenated collective output for matching dimensionality of the vectors in the latent space.

In another example embodiment of any of the above, the transforming includes input embedding the input to transform dimensionality of the input to dimensionality of the encoder.

In another example embodiment of any of the above, the latent space has a fixed dimensionality.

In another example embodiment of any of the above, the method is performed by a processor of the base station.

In another example embodiment of any of the above, the CSI includes CSI between each antenna of the BS and each UE.

Another example embodiment is a base station, including: a plurality of antennas; a processor; and a memory associated with the processor which stores instructions that when executed by the processor causes the processor to: receive an input comprising a sequence of vectors of channel state information (CSI) between each UE of a plurality of UEs and a base station with a plurality of antennas in the wireless communication network; transform the input to an input embedding; and input the input embedding to system implementing a neural network model, the neural network model configured to generate pairing information for each UE based on the input embedding, the pairing information for each UE indicative of whether the UE is to share a frequency resource during a shared time interval.

In another example embodiment of the device, the device is a base station comprising the plurality of antennas.

Another example embodiment is a non-transitory computer-readable medium which stores instructions that when executed by a processor causes the processor to perform multi-user pairing, the instructions including: instructions for receiving channel state information (CSI) between each UE of a plurality of UEs and a base station with a plurality of antennas in the wireless communication network; instructions for converting the UE CSIs to an input sequence; and instructions for inputting the input sequence to system implementing a neural network model, the neural network model configured to generate pairing information for each UE based on the input sequence, the pairing information for each UE indicative of whether the UE is to share a frequency resource during a shared time interval.

An example embodiment is a device including a processor and a memory which stores instructions that when executed by the processor causes the processor to perform any of the described methods, processes or functions.

An example embodiment is a non-transitory computer-readable medium which stores instructions that when executed by a processor causes the processor to perform any of the described methods, processes or functions.

BRIEF DESCRIPTION OF THE DRAWINGS

For a more complete understanding of example embodiments, and the advantages thereof, reference is now made to the following description taken in conjunction with the accompanying drawings, in which:

FIG. 7 illustrates an example table of simulated performance data of the neural network model of FIG. 3;

FIG. 8 illustrates an example table of simulated performance data of the neural network model of FIG. 3;

DETAILED DESCRIPTION OF EXAMPLE EMBODIMENTS

A base station (BS), also referred to as a radio access network (RAN) node, is used to communicate wirelessly with wireless communication devices, generally called user equipment (UE). The number of UEs that require connecting to wireless communication networks is increasing at a rapid pace. In addition to mobile phones, there are other types of UEs that will require connection to wireless communication networks, such as tablets, connected autonomous vehicles, wearable technologies, Internet of Things (IoT) devices, smart city devices, and other wireless communication devices. The BS has finite resources for communicating with the UEs, with limited available frequency resources and limited spatial (directional) resources from the BS. The BS is required to communicate with an increasing number of UEs within the wireless communication network.

A BS has a plurality of antennas, for example, in an antenna array. In example embodiments, a frequency resource is simultaneously shared between different UEs during a shared time interval. A shared time interval is a time interval in which multiple UEs use the same frequency resource (by sending or receiving data over that frequency resource). The BS communicates with a particular UE using one or more antennas of the antenna array. Different antennas are used to communicate with different UEs. UEs that share a frequency resource during a shared time interval are referred to as paired UEs, and the process of pairing UEs is referred to in the art as Multi-User Pairing (MUP).

If MUP is done poorly, interference among paired UEs will impact the network capacity adversely and deteriorate the network capacity. In some instances, MUP can result in worse network capacity than not pairing UEs at all, e.g. the overall network capacity or throughput will be smaller when there is pairing of UEs than when there is no pairing of UEs.

An example embodiment is an improve method performed by a BS for performing MUP neural networks.

In an example embodiment, the BS learns a neural network model to select which UEs to pair in order to optimize or increase network capacity. In an example, the neural network model includes a multi-head attention based encoder, and a decoder, described in greater detail herein.

Figure 1A:
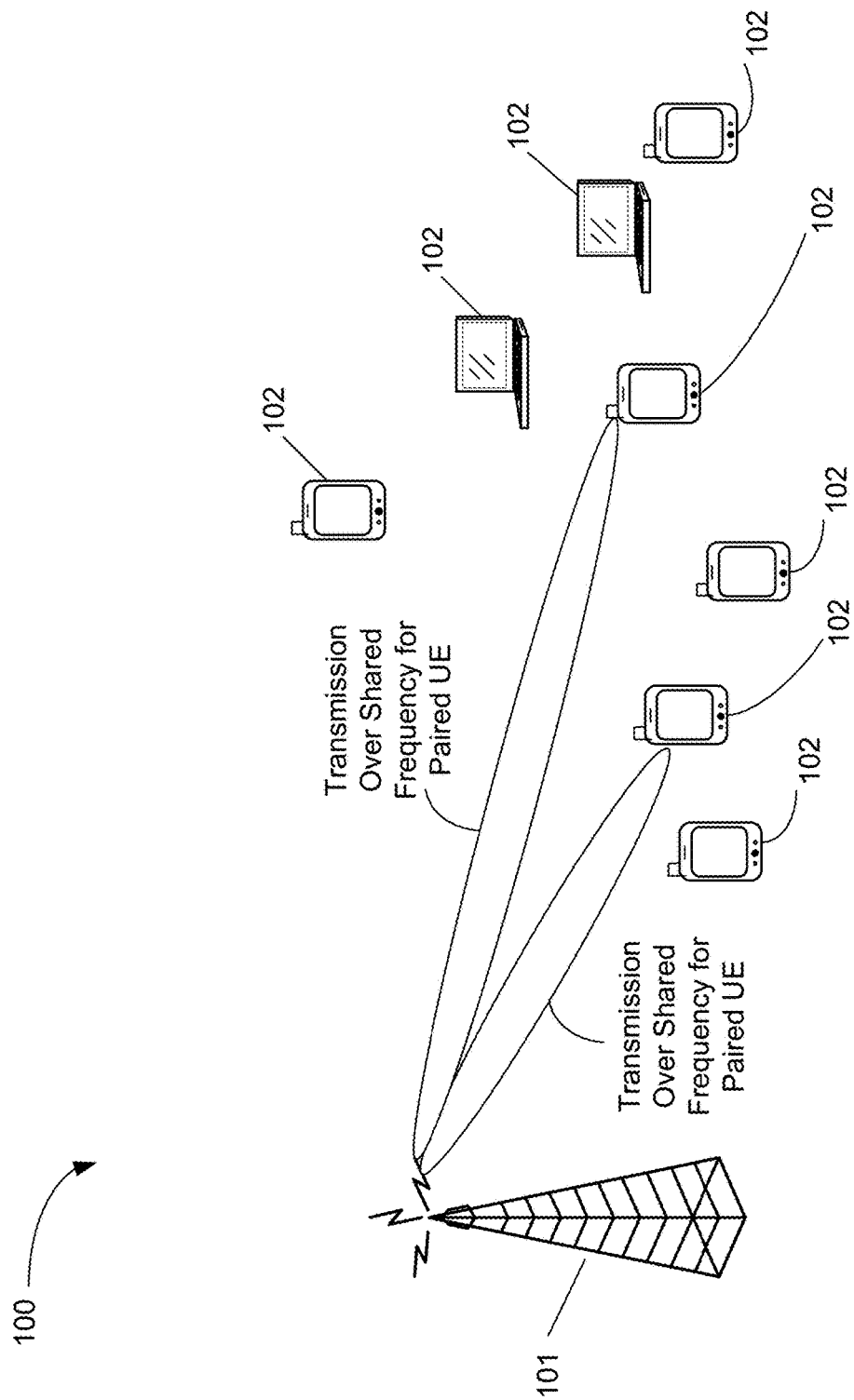
FIG. 1A is a schematic diagram illustrating a wireless communication network for multiple access communications according to an example embodiment.

FIG. 1A illustrates an example schematic diagram of a wireless communication system 100 in which example embodiments of pairing multiple UEs may be implemented. The wireless communication system 100 includes a BS 101 and at least two UEs 102 in a wireless communication network. The BS 101 provides access to the cellular network, Internet or a distribution service for the associated UEs 102. The UEs 102 may be mobile communication devices enabled for wireless communications, including but not limited to mobile phones, smart phones, laptops, tablet computers, machine-type communication devices, Internet of Things (IoT) devices, and wireless sensing and reporting devices. The BS 101 and the UEs 102 can each be configured for uplink (UL) and downlink (DL) transmissions in accordance with 3GPP telecommunications standards.

The BS 101 may provide access to the Internet or a distribution service for one or more UEs 102 that are wirelessly and communicatively associated with the BS 101. The BS 101 can access the Internet or the distribution service by way of wired or wireless communication. Although only one single BS 101 is shown, this is only illustrative and is not intended to be limiting. In other examples, there may be more than one BS 101 within the wireless communication system 100, and some of the more than one BS 101 can have overlapping coverage areas.

Figure 1B:
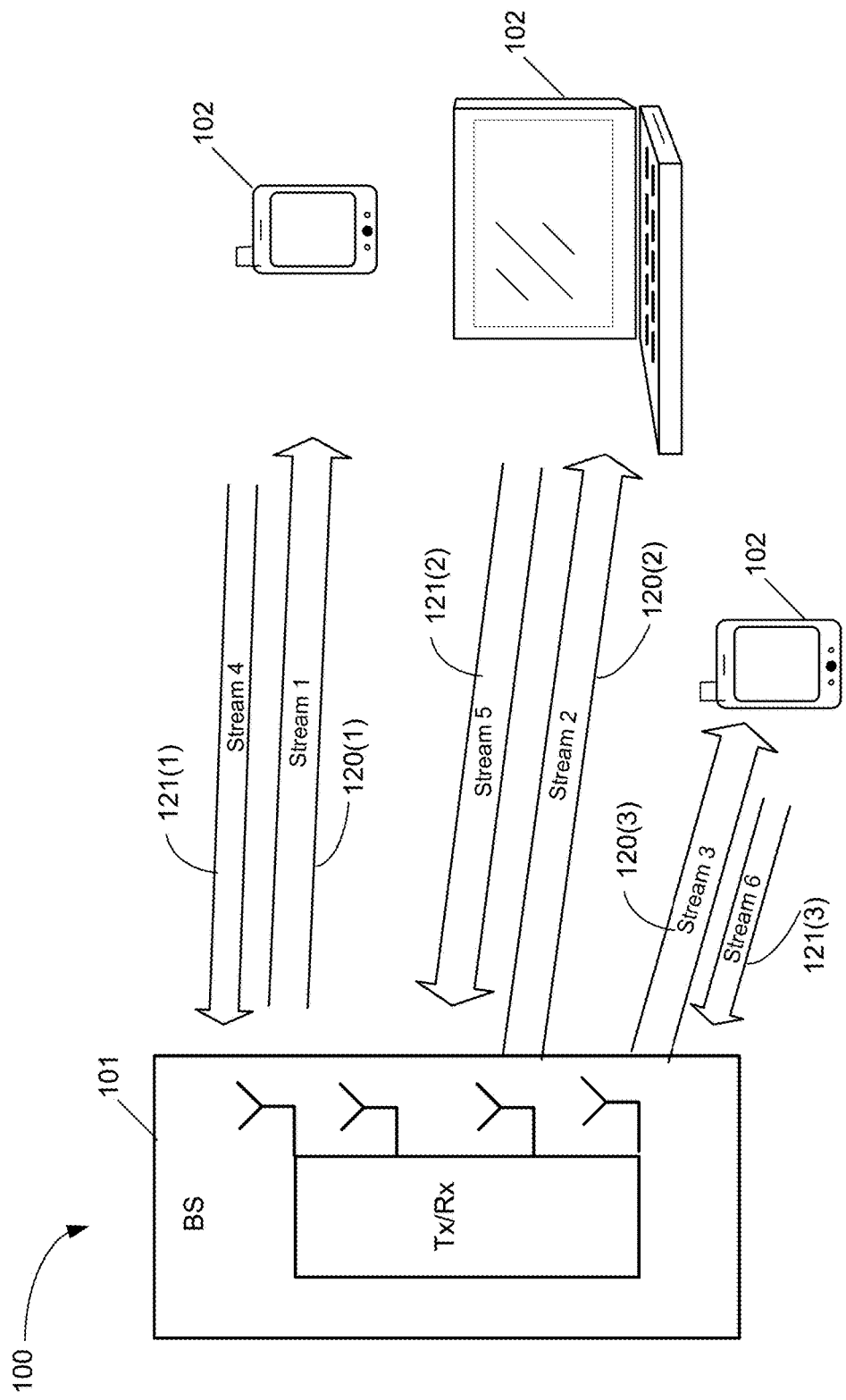
FIG. 1B is a schematic diagram of uplink (UL) and downlink (DL) transmissions of the wireless communication according to an example embodiment.

Examples of the wireless communication networks supported by the BS 101 include mobile telecommunication radio network technologies such as third Generation (3G), 4G Long Term Evolution (LTE), and 5G. Referring to FIG. 1B, examples of the wireless communication network will be described in the context of wireless communications between a plurality of UEs 102 and one BS 101. The wireless communication network 100 supports multiuser multiple-input multiple-output (MU-MIMO) transmissions, also known as a multiple access transmissions. The BS 101 and at least one of the UEs 102 may be configured for single user (SU) communications in other examples (not shown here). MU-MIMO based transmission, which can use multiple antennas, allows simultaneous channel access by the UEs 102 for effective use of available channels in the wireless communication network. The BS 101 can simultaneously transmit spatial-multiplexed user data to the UEs 102. User data can be simultaneously transmitted by the BS 101 to the UEs 102 using a plurality of respective spatial streams (stream 1, stream 2, stream 3 shown in FIG. 1B) in the DL direction, shown as DL MU transmissions 120(1), 120(2), 120(3) (generically referred to as DL MU transmission 120). In the DL direction, user data transmitted to each UE 102 may be different for each UE 102. In the UL direction, user data can be simultaneously transmitted to the BS 101 using a plurality of respective spatial streams (stream 4, stream 5, stream 6 shown in FIG. 1B), shown as UL MU transmissions 121(1), 121(2), 121(3) (generically referred to as UL MU transmission 121). In some embodiments, the DL MU transmissions 120 share the same frequency band and differ in space by using different antenna(s) of the BS 101. In some embodiments, the UL MU transmissions 121 share the same frequency band and differ in space by using different antenna(s) of the BS 101.

In some examples, the BS 101 communicates with the paired UEs using non-orthogonal multiple access over the particular shared frequency band. In some other example embodiments, not shown here, the BS 101 communicates with the paired UEs using orthogonal multiple access, such as Orthogonal frequency-division multiple access (OFDMA) or Code-Division Multiple Access (CDMA). When communicating using orthogonal multiple access, a particular resource (i.e., both a frequency resource and a time resource) is shared amongst the paired UEs. Examples of the particular resource to be paired in orthogonal multiple access can include a frequency resource, a time resource, or a code domain resource.

For example, referring to FIG. 1A, the BS 101 can assign a particular frequency resource to a first UE 102 and a second UE 102 for simultaneous UL transmission or simultaneous DL transmission. Each of the first UE 102 and the second UE 102 for that particular frequency resource are simultaneously serviced by different antenna(s) of the BS 101 during the same time interval. The BS 101 selects the first UE 102 and the second UE 102 to pair for the particular frequency resource in order to optimize overall network capacity of the wireless communication system 100 from the BS 101. In some examples, one or more further UEs 102 are paired with first UE 102 and the second UE 102 for that frequency resource.

The remaining UEs 102 that are not paired are denoted unpaired UEs 102. Unpaired UEs 102 are not paired and therefore will not be communicating in the designated shared time interval.

Referring still to FIG. 1A, in some examples, the BS 101 has multiple-input and multiple-output (MIMO) antennas and each UEs 102 has a single antenna (or can operate with single-antenna functionality). The number of UEs 102 is denoted as K, and the number of antennas in the BS 101 is denoted as D, and each can be varied in different simulated experiments. Typically, 8<K<40 and D is typically a power of 2 such as: D∈{8, 16, 32}.

In some example embodiments, the BS 101 classifies all of the UEs 102 within range of the BS 101 into two categories: paired UEs versus unpaired UEs. Using this description, the decision by the BS 101 is now a binary classification for each of the KUEs 102. Due to network requirements, this binary classification need to be made in real time, or near real time such as within the shared time interval (i.e., TTI) which is in order of 1 to 5 milliseconds. For KUEs 102, the potential combinations for paired UEs translate into a combinatorial optimization problem with $2^K$ possibilities or permutations.

In some conventional solutions that seek to share frequency resources for communication with multiple UEs, the BS 101 may assign UEs 102 to multiple groups merely according to their spatial locations in order to share frequency resources between disparate spatially located UEs 102. However, clustering (i.e., the grouping of the UEs into multiple groups) is a rigid solution in that once a particular UE is assigned to a particular cluster (i.e., group), that UE is not transferrable to another cluster (i.e., group), which can also lead to suboptimal results.

Another example solution is a brute force solution. The brute force solution exhaustively calculates the network capacity for all possible $2^K$ combinations of UE pairings (i.e., pairings of UEs). The pairing of UEs with the highest network capacity is the optimal pairing of the UEs 102. This brute force solution is not feasible for networks with large or even moderate number of UEs 102 per BS 101, in which the BS 101 typically has 32, 64 or 128 antennas.

Another example solution for pairing UEs is a greedy algorithm. In the greedy algorithm, all UEs 102 are sorted based on their signal to noise ratio (SNR) (alternatively signal to interference plus noise ratio, SINR). The greedy algorithm starts by selecting an initial UE 102 with the highest SNR, and assigns the initial UE 102 to a paired UEs group. The greedy algorithm then iteratively goes through the next highest SNR UE 102 and selects the next highest SNR UE 102 to pair with the initial UE 102 only if the next highest SNR UE 102 increases the overall network capacity when paired with the initial UE 102. The selection process is repeated through each UE 102 one by one, with the selection of the particular UE 102 to pair being made when that UE 102 increases the overall network capacity when paired with the existing paired UE group. However, due to the sequential nature of the greedy algorithm, the greedy algorithm is not scalable to networks with large number of UEs and may not be feasible for real-time or near real-time execution.

Figure 3:
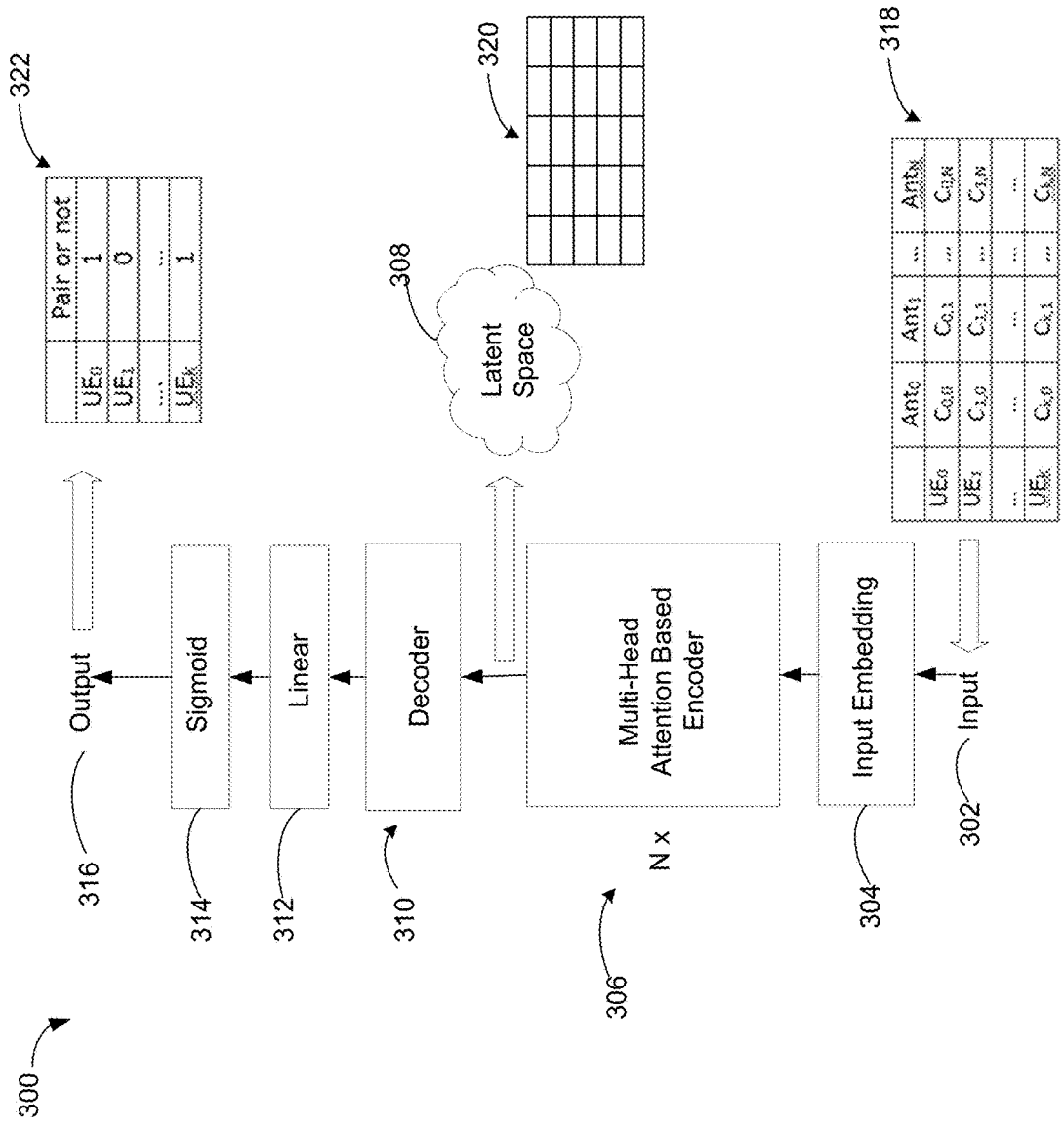
FIG. 3 illustrates an example software system executable by a base station for wireless multi-user pairing of a plurality of user equipment (UE), in accordance with an example embodiment.

FIG. 3 illustrates an example software system 300 that implements a neural network model for performing MUP, in accordance with an example embodiment. As shown in FIG. 3, the neural network model implemented by the software system 300 includes an input embedding module 304, a multi-head attention based encoder 306, a decoder 310, a transformation module 312, a sigmoid module 314 that generates an output 316. Although illustrated as separate modules, in some embodiments the neural network model 300 may a deep neural network that includes layers that perform the functions performed by the input embedding module 304, the multi-head attention based encoder 306, the decoder 310, the transformation module 312, the sigmoid module 314, respectively.

In example embodiments, the neural network model implemented by software system 300 selects which UEs 102 to pair (versus which UEs 102 to leave unpaired) in order to optimize network capacity of the wireless communication network supported by the BS 101.

The input 302 to the software system 300 implementing the neural network model is the stacked CSI from multiple (K) UEs 102, each receiving signal from N different antennas of the BS 101. As shown in FIG. 3, the input 302 to the neural network model implemented by system software 300 is the CSI matrix 318. In some embodiments, the input 302 is a CSI matrix 318 for each UE. In some embodiments, the CSI matrix 318 includes rows with each row being a vector of CSI between the UE and each of the plurality of antennas of the BS 101. Thus, the CSI matrix 318 is a sequence of vectors in which each vector in the sequence of vectors is associated with one of the multiple (K) UEs. In this embodiment, the input 302 is the sequence of vectors comprising the vectors of CSI between all the UEs and each of the plurality of antennas. The input embedding module 304 receives the CSI matrix 318 (i.e., the sequence of vectors) in relation to K UEs 102 and N antennas, and through a matrix transformation produces a vector of real values for each UE 102. The dimensionality of the vector of real values for each UE 102 is the same as the encoder 306 dimensionality, denoted ($d_{model}$). The output of the input embedding module 304 can be called "input embedding" or "embeddings" in short.

The multi-head attention based encoder 306 receives the vector of real values fixed dimensionality ($d_{model}$) in relation to each UE 102. The multi-head attention based encoder 306 encoder has N identical layers in series, and in each identical layer has h separate attention heads in parallel. Each attention head uses abstractions that are useful for calculating the attention score (e.g. how important different input UEs are for making a decision for pairing a given UE). These abstractions are called query (Q), key (K) and value (V), which are created by separately multiplying the UE embedding by three respective matrices that are trained during the training process of the neural network model. Therefore Q, K and V are created from the UE embedding. Through a dot product of all q and k vectors the multi-head attention based encoder 306 can determine the attention score of the input embedding for each UE on input embeddings for other UEs. These attention scores will be multiplied by the v vectors and summed up to create the latent representation for each UE. Note that this latent representation in the latent space 308 encodes the context information of the entire input sequence (i.e. all UE CSIs). In other words the attention heads allow the encoder to encode the degree of importance of all pairs of UEs in the final latent representation of each UE. The space of these latent representations is called the latent space 308.

The decoder 310 is configured for projecting the real-valued latent representation for each UE from the latent space 308 into a value that represents whether the UE should be paired or not. The projecting or mapping can be done by a plurality of fully-connected feed-forward (FF) modules, denoted $ff_{num}$. The dimensionality of the values being passed between the FF modules is decided by a parameter that is adjusted according to the size of the network. The transformation module 312 is responsible for changing the dimensionality back to K.

The transformation module 312 is configured to adjust the dimensionality of the decoded vectors (provided by the decoder 310) back to the dimensionality (i.e. K) of the input UE CSIs before the input embedding. This transformation module 312 can include a fully connected FF module with linear activation function, and therefore adds no nonlinearity to the software system 300.

The sigmoid module 314 translates the calculated values for each UE into a 1 or 0; 1 indicating that the given UE 102 should be added to the paired UEs group, and 0 indicating otherwise.

The output 316 is the final pairing solutions, being a binary decision value for each UE 102, whether or not include each UE 102 in the final paired UEs group.

In example embodiments, as illustrated in FIG. 3, the input 302 to the input embedding module 304 is a CSI matrix 318 of the CSI between each antenna and each UE. In some example embodiments, a respective CSI matrix 318 is generated for each UE in relation to the antennas. The latent space 308 includes latent space vectors 320 which can be of fixed dimension. In example embodiments, as illustrated in FIG. 3, the output 316 is a pairing vector 322 of dimension K, in which K is the number of UEs 102.

In example embodiments, the neural network model 300 optimizes the network capacity of the wireless communication network that includes BS 101. Generally, network capacity is correlated with the amount of data transferred by the BS 101 in a shared time interval (such as TTI). For DL transmission, the signal received by each $UE_i$, denoted $y_i$, can be calculated as follows:

$$y_i = H_i w_i x_i + \Sigma_{k \neq i} H_i w_k x_k + \mathcal{N}(0, \sigma^2), \text{ wherein:}$$

$x_i$ is the desired signal meant for $UE_i$,
$w_i$ is the beamforming weight for $UE_i$, and
$H_i$ is the channel matrix (CSI) from $UE_i$ to BS.

The $UE_i$'s SINR is calculated as:

$$SINR_i = \frac{\|H_i w_i\|^2}{\sum_{k \neq i} \|H_i w_k\|^2 + \sigma^2},$$

wherein:
$\|H_i w_i\|^2$ is $UE_i$'s desired signal power,
$\Sigma_{k \neq i} H_i w_k \|H_i w_k\|^2$ is the interference signal power, and
$\sigma^2$ is the noise power.

The total paired UE overall capacity (C) is:

$$C = \sum_i \log_2(1 + SINR_i)$$

Figure 4:
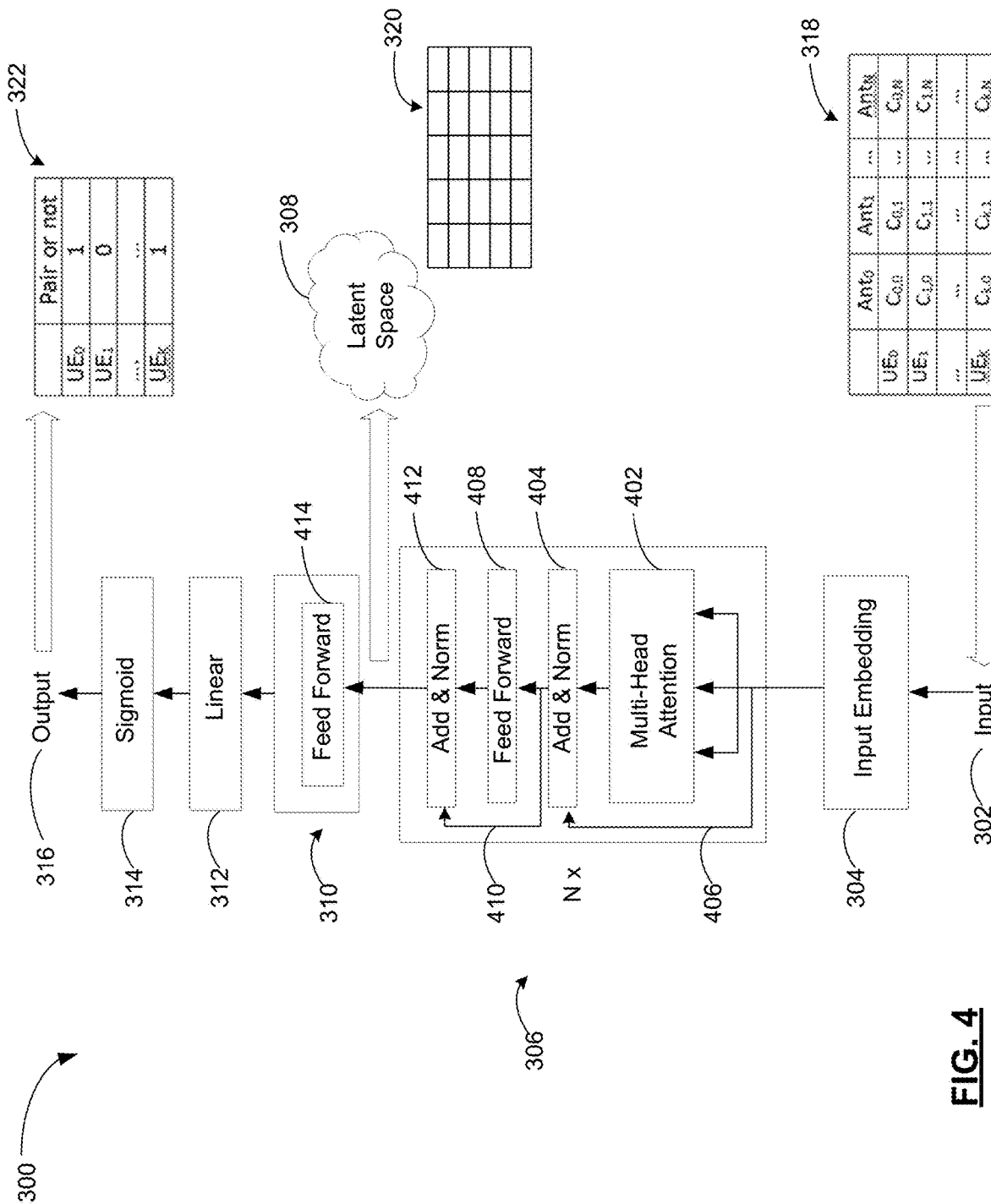
FIG. 4 is a detailed example of the software system of FIG. 3.

FIG. 4 illustrates a detailed example of the neural network model implemented by the software system 300, including details of the multi-head attention based encoder 306 and the decoder 310. In an example embodiment, the input 302 is a single input. For example, the single input is the CSI matrix 318. To be able to use the multi-head based encoder 306, the input embedding module 304 is configured to receive the CSI matrix 318 and transform the CSI matrix 318 into an input embedding having a suitable format. In example embodiments, the format of the CSI matrix 318 has a CSI ("$C_{UE,Ant}$") for each UE in the row ("$UE_i$") and for each antenna in the column ("$Ant_i$"). The CSI matrix 318 can be suitably mapped (transformed) to dimensionality of the multi-head attention based encoder 306 using the input embedding module 304.

In an example embodiment, the input embedding module 304 is configured to perform a linear transformation of the dimensionality of the CSI matrix 318 to an input embedding that matches the dimensionality of the multi-head attention based encoder 306. The input embedding module 304 uses a dot product weight matrix to perform the linear transformation.

In an example embodiment, the output 316 of the neural network model implemented by the software system 300 is a single output. In an example embodiment, the output 316 is the pairing vector 322 of dimension K, in which K is the number of UEs. The output 316 can be represented as a string of binary values. A value of 1 at index i indicates that $UE_i$ has been added to the paired UEs group, and a value of 0 indicates that $UE_i$ has not been selected to be paired. The output 316 is generated from a sigmoid function performed by the sigmoid module 314 and can be in sigmoid units (or softmax units) depending on the number of classes, C, which in the present example embodiment is 2 (paired UEs versus unpaired UEs).

Referring still to FIG. 4, the multi-head attention based encoder 306 will be described in greater detail. The multi-head attention based encoder 306 includes a neural network having two sub-layers. The first sub-layer includes a multi-head attention mechanism 402 followed by an addition and normalization layer 404. In example embodiments, the multi-head attention mechanism 402 has self-attention. The second sub-layer includes a position-wise fully-connected feed-forward layer 408 followed by an addition and normalization layer 412. The input to the first sub-layer is connected to the addition and normalization layer 404 via a skip connection 406. The position-wise fully-connected feed-forward 408 of the second sub-layer serially receives output from the addition and normalization layer 404 of the first sub-layer. The addition and normalization layer 412 of the second sub-layer receives the output of the addition and normalization layer 404 via a skip connection 412.

In some alternate example embodiments, not shown, the multi-head attention based encoder 306 can be replaced with a number of feed-forward neural layers.

The multi-head attention based encoder 306 has a stack of attention mechanisms, each attention mechanism including the first sub-layer and the second sub-layer. Both the input and output dimensions of the multi-head attention based encoder 306 are denoted $d_{model}$. In example embodiments, in order to match the dimensionality (D) of the CSI matrix 318 and the dimensionality ($d_{model}$) of the multi-head attention based encoder 306, the input embedding module 304 is a dimensionality transformer configured to project the dimension of the CSI matrix 318 to the embedding space.

Figure 5:
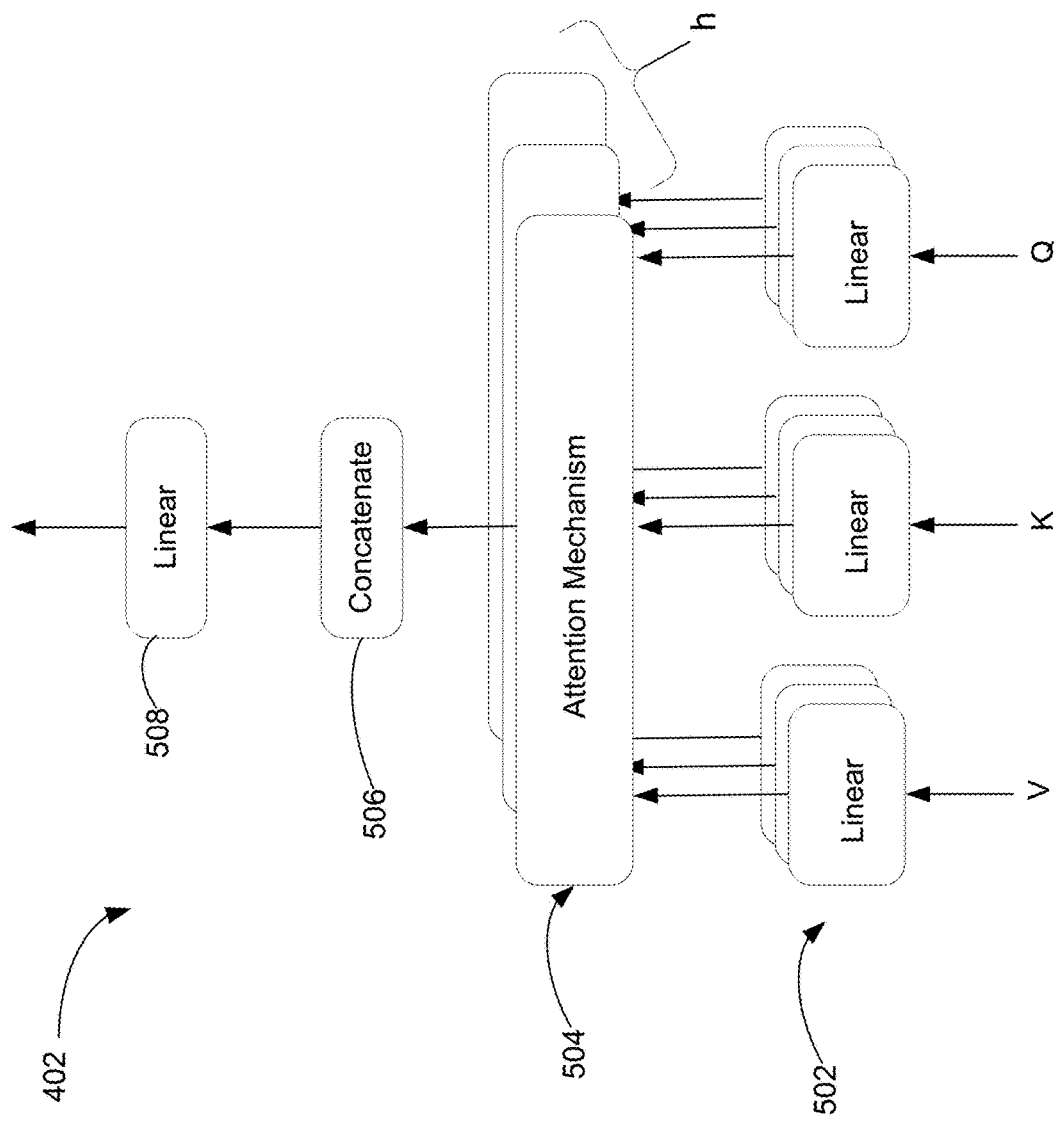
FIG. 5 is an example multi-head attention mechanism for the software system of FIG. 4.

FIG. 5 shows an example implementation of the multi-head attention mechanism 402. The multi-head attention mechanism 402 receives three inputs, Q, K, V, where K is a key matrix, Q is a query matrix, and V is a value matrix. The multi-head attention mechanism 402 includes a plurality of transformation modules 502 and h attention mechanisms 504 in parallel. Each attention mechanism 504 receives three inputs: the values (of dimension $d_v$) packed together into the matrix V, the keys and queries (both of dimensions $d_k$) and respectively packed into the matrices K and Q. At transformation modules 502, the values, the keys, and the queries are linearly projected h times with different learned linear projections from dimension $d_{model}$ to dimensions $d_v$, $d_k$ and $d_k$ respectively. The multi-head attention mechanism 402 linearly projects the queries, keys and values h instances (in parallel) with different, learned linear projections to $d_k$, $d_k$ and $d_v$, respectively. Mathematically, each individual attention mechanism 504 of the multi-head attention mechanism 402 module performs a dot-product attention with scaling factor using the equation:

$$\text{Attention}(Q, K, V) = \text{softmax}\left(\frac{QK^T}{\sqrt{d_k}}\right)V$$

The output of the attention mechanism 504 is a weighted sum of the Q, K, V values. The normalized weights are indications of how much each input key interacts with a specific query. The scaling factor $1/\sqrt{d_k}$ rescales the dot product in order to prevent it to grow too large as the dimension of the keys and queries $d_k$ increases and thus helps to stabilize the gradients of the softmax function.

In other example embodiments, each individual attention mechanism 504 can be another type of attention mechanism other than dot-product attention with scaling factor.

At the attention mechanism 504, the dot product and scaling is performed on the linear projections of the values, the keys, and the queries. The h outputs of dimension $d_v$ resulting from the different attention mechanisms from the attention mechanism 504 are then concatenated using concatenation function 506 and once again projected using transformation module 508, resulting in the final $d_{model}$-dimensional values. The final $d_{model}$-dimensional values allow the multi-head attention mechanism 402 to exploit information from different representation subspaces at different positions.

Mathematically, the output from the multi-head attention mechanism 402 is as follows:

$$\text{head}(Q,K,V)=\text{Concat}(\text{head}_1, \ldots, \text{head}_h)W^O,$$

where $\text{head}_i=\text{Attention}(QW_i^Q, KW_i^K, VW_i^V)$ for $i=1, \ldots, h$ The projection matrices and their respective dimensions in parentheses are as follows:

$$W^O(hd_v \times d_{model}), W_i^Q(d_{model} \times d_k), W_i^K((d_{model} \times d_k), W_i^V (d_{model} \times d_v).$$

The multi-head attention mechanism 402 includes h=8 parallel attention layers (otherwise referred to as attention heads). For each of the attention layers, $d_k=d_v=d_{model}/h$. For example, if $d_{model}=256$ and h=8, then $d_k=d_v=d_{model}/h=32$.

Generally, $d_k<d_{model}$ and $d_v<d_{model}$.

Referring again to FIG. 4, the second sub-layer of the multi-head attention based encoder 306 includes the feed forward network 408 which includes two fully-connected layers, followed by the addition and normalization layer 410. The addition and normalization layer 410 implements a rectified linear unit (ReLU) activation function that transforms the output received from the multi-head attention mechanism 402, as follows:

$$FFN(x)=\max(0, xW_1+b_1)W_2+b_2,$$

where $W_1$ and $b_1$ are each a weight matrix of the first sub-layer of the multi-head attention based encoder 306, where $W_2$ and $b_2$ are each a weight matrix of the second sub-layer of the multi-head attention based encoder 306.

The input and output dimensionality is $d_{model}$ and the inner-layer has a dimension of $d_{ff}$. The fully-connected feed-forward neural network is applied to each position separately. The input parameters can be the same across the different positions.

Referring again to FIG. 4, the decoder 310 is now described in greater detail. In example embodiments, the decoder 310 is a feed forward (FF) neural network that includes a stack of $ff_{num}$ fully-connected layers of dimension $d_{hid}$. The transformer module 312 receives a decoded latent space representation from the $ff_{num}$ layers and maps the output from the decoder 310 in order to match the dimension of the decoder 310 with the number of classes C (in this case, 2). From the output of the decoder 310, the transformer module 312 performs a rectified linear unit (ReLU) activation function. A dropout with probability p is applied to the output of the transformer module 312, for example using the sigmoid module 314 which performs a sigmoid function.

In an example embodiment, the neural network model implemented by the software system 300 is trained using supervised learning. For example, supervised learning allows the software system 300 to learn from existing domain knowledge in form of high-quality labels. In an example embodiment, the neural network model implemented by the software system 300 is trained using a training dataset that includes labeled data samples. In an example embodiment, the label for one or more of the labeled data samples is generated using the greedy algorithm. Other algorithms can be used for generating the labels for labeled data samples the neural network model of the software system 300, such as the brute force algorithm mentioned above.

For the supervised learning, the neural network model implemented by the software system 300 requires labeled data samples for training. Each labeled data sample is a <x, y> pair, with x representing the input (i.e., the measured or simulated CSI between a UE of the plurality of UEs and the plurality of antennas of the base station) and y representing the output (i.e., the pairing information for the UE). A wireless network simulator generates the CSIs for UEs in different settings and scenarios, e.g. different number of UEs in the wireless network, or different channel or air interface quality. The CSI represent x inputs in the <x, y> pair, and are used as input to the greedy algorithm. As described above, the greedy algorithm is one solution to determine pairing information for any given input sequence (e.g. CSIs for a number of UEs). The pairing information represents the y in the <x, y> pair, for training. Having both x and y, a single labeled data sample can be created. This process is repeated to create a sufficient number of labeled data samples to train the neural network implemented by the software system 300 end-to-end from the input 302 to the output 316.

In an example embodiment of the training, the simulator generates CSI for multiple UEs. As an example, the simulator generates the CSI for a network with 8 UEs, using predetermined channel (i.e. air interface) quality parameters to determine the CSI. The CSI between the BS 101 and each UE is fed to the greedy algorithm. For example, the greedy algorithm finds the UE with highest SNR and adds that UE to the paired group of UEs. The greedy algorithm then iteratively adds the UEs with the next highest SNRs to the paired UEs group if and only if the capacity of the network increases by this addition. The greedy algorithm provides a suboptimal pairing solution for the given UE.

The CSI for a UE (x in the <x, y> pair) and the pairing solution (y in the <x, y> pair) from the greedy algorithm form one labeled data sample that is for training the neural network model. The process of determining <x,y> pairs is repeated, for example hundreds of thousands of times with different channel quality (e.g., a parameter to define the channel/air interface quality) and different numbers of UEs. These labeled data samples are used to train the neural network model implemented by the software system 300 end-to-end. Therefore, all parameters defining all neural network layers of the neural network model implemented by the software system 300 are optimized together.

Note that the quality of labeled data samples generated using the greedy algorithm were evaluated by comparing the labeled data samples against the optimal solutions acquired via a brute-force method searching all possible combinations of pairings. It was found that the optimal pairings were only approximately 3-5% superior to the greedy algorithm pairings. Therefore, the labels data samples generated using the greedy algorithm are sufficient to use for training the neural network model for the system software 300.

Conceptually, the multi-head attention mechanism 402 provides multiple "representation subspaces". The multi-headed attention mechanism 402 provides more than one (multiple) sets of Query/Key/Value weight matrices (e.g. h=8, resulting in eight weight sets for each encoder 306). As well, the weight matrices are learned for the decoder 310, the transformation module 312 and the sigmoid module 314.

In an example embodiment, each of the weight sets of the neural network model implemented by the software system 300 300 is randomly initialized. Then, after training, each weight set is used to project input embeddings into a different representation of the latent space 308, which is then decoded by the decoder 310, mapped by the transformation module 312, and the pairing vector 316 is decided using the sigmoid module 314.

A simulation of capacity performance of the software system 300 ($C^A$) is implemented, and can be compared with a baseline network capacity performance obtained from performance of the greedy algorithm ($C^G$), described above. For example, a ratio of $C^A$ to $C^G$ can be calculated for the comparison. The ratio between the network capacity (per instance) obtained with the software system 300 ($C^A$) and with the greedy algorithm ($C^G$) is calculated. A mean average is calculated for the ratios obtained for each instance belonging to the test set. Ratios less than one indicate the greedy algorithm's advantage, and ratios greater than one indicate the multi-head attention based model's advantage. The maximum ratio from the simulation is also determined.

Both the neural network model implemented by the software system 300 and the greedy algorithm are simulated using the same input (noisy data). The greedy method takes N features (complex values) while the neural network model implemented by the software system 300 takes 2N (separated real and imaginary parts). As well, when calculating the total capacity associated with the prediction by the neural network model implemented by the software system 300 and the greedy algorithm, the CSI original values are used (with no noise added), with N features (which are complex values) as follows:

a) Input dimension greedy: K×N;
b) Output dimension greedy: K;
c) Input dimension capacity: $n_p$×N with $n_p$ the number of paired users ($n_p$<K).

Figure 6A:
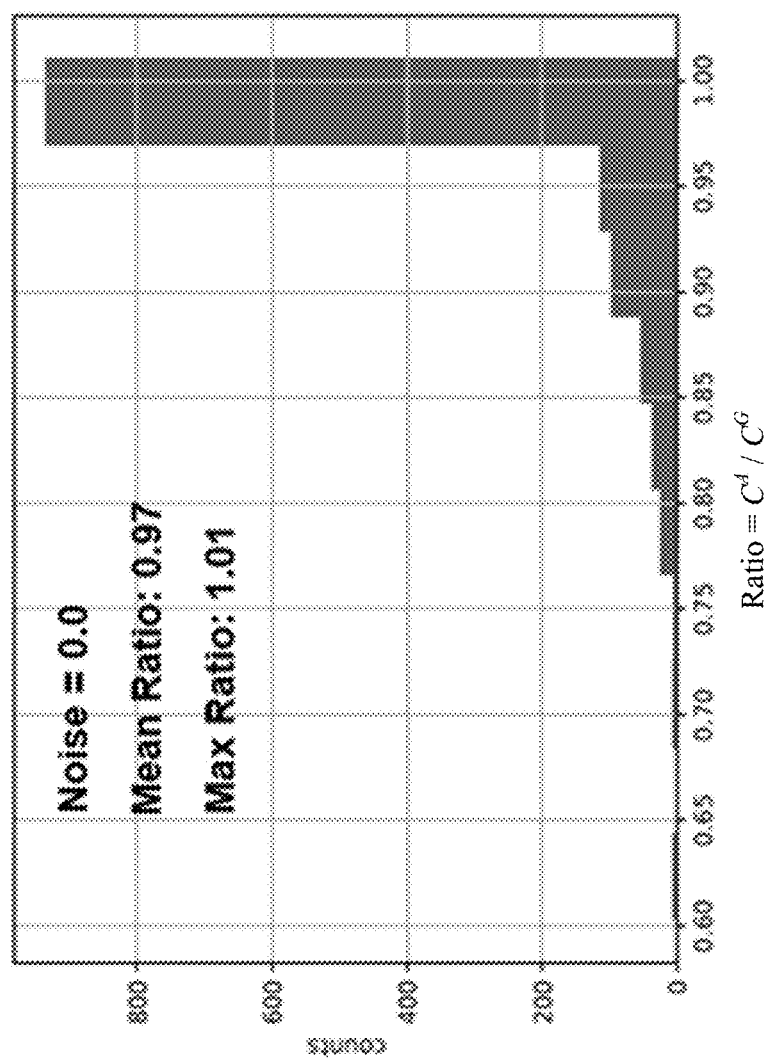
FIG. 6A illustrates an example histogram of simulated performance data of the neural network model of FIG. 3, with noise power equal to 0 of signal power.
Figure 6B:
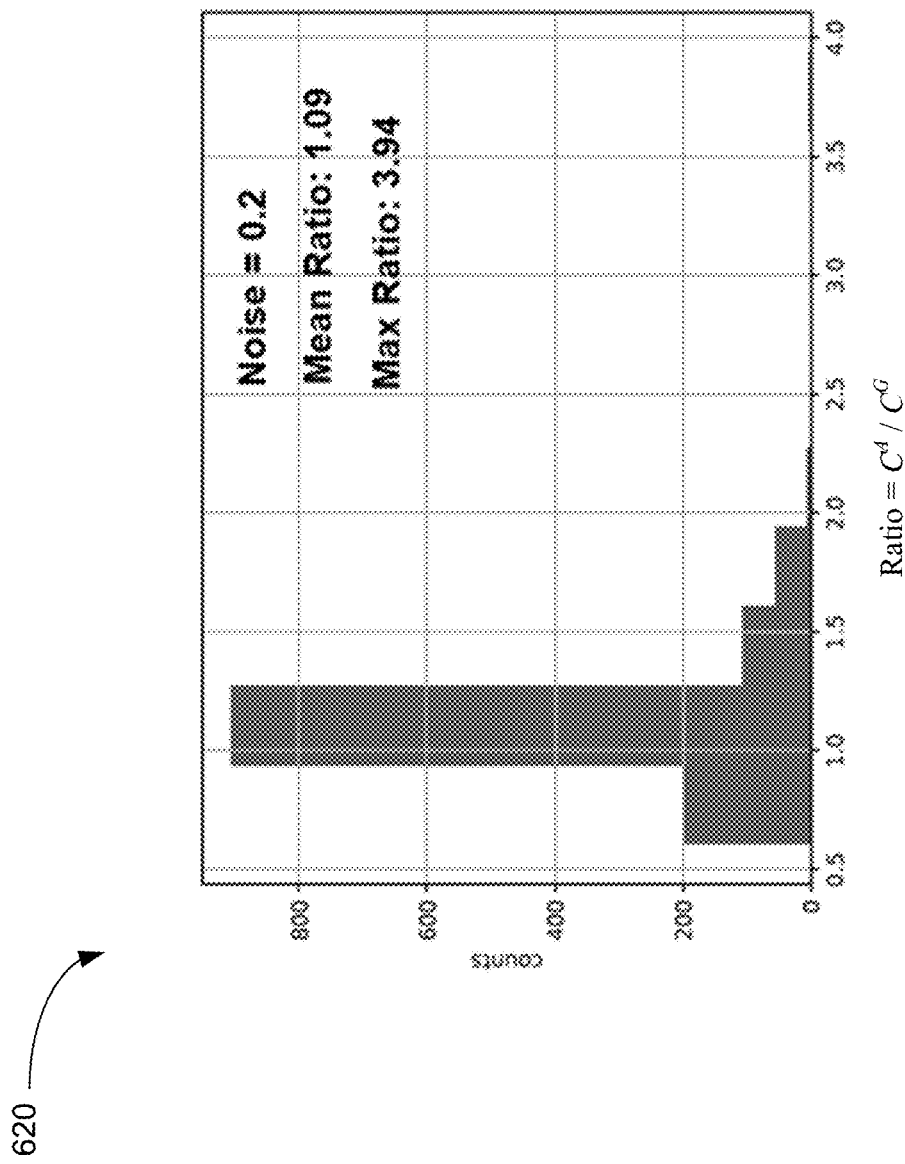
FIG. 6B illustrates an example histogram of simulated performance data of the neural network model of FIG. 3, with noise power equal to 0.2 of signal power.
Figure 6C:
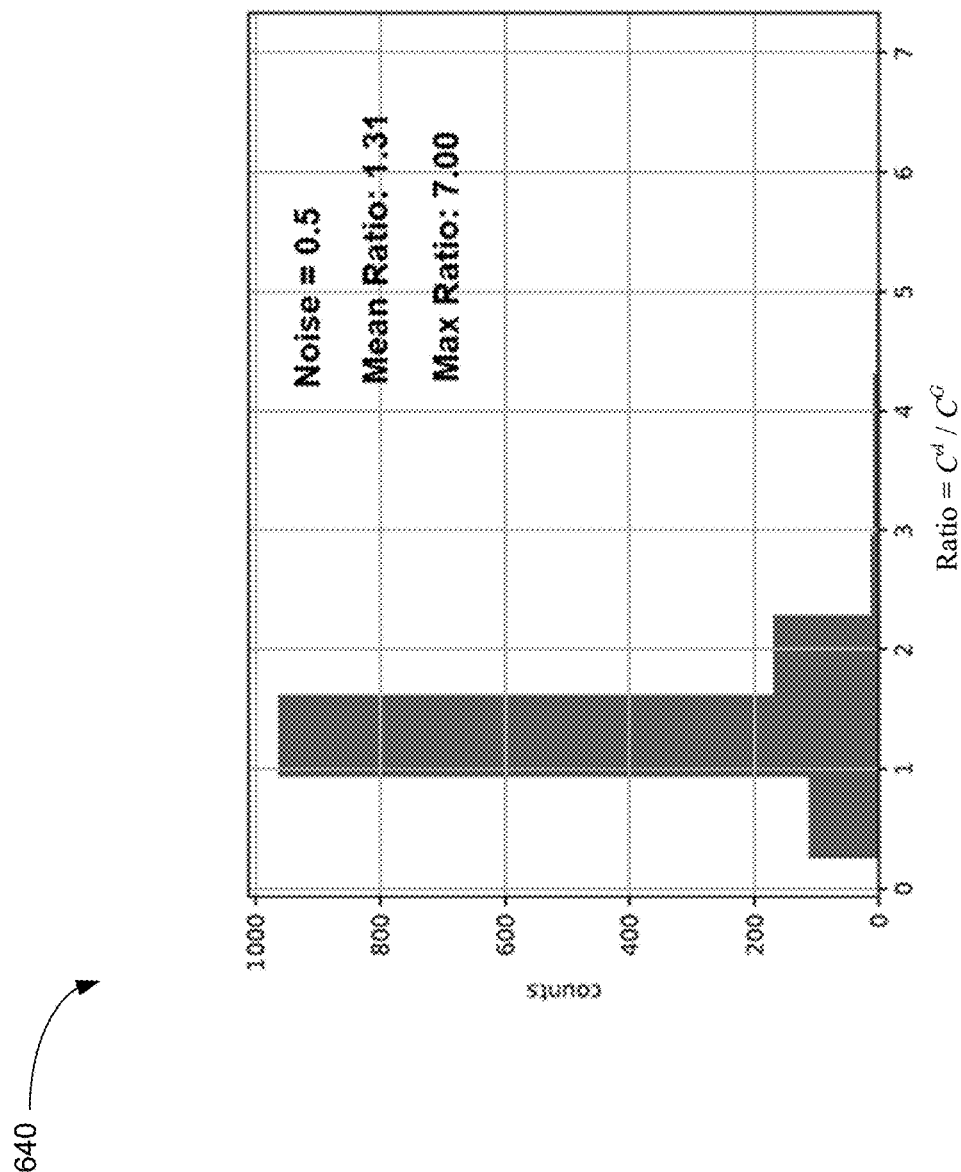
FIG. 6C illustrates an example histogram of simulated performance data of the neural network model of FIG. 3, with noise power equal to 0.5 of signal power.

FIG. 6A illustrates an example histogram 600 of simulated performance data of the neural network model implemented by the software system 300 of FIG. 3, with noise power equal to 0 of signal power. FIG. 6B illustrates an example histogram 620 of simulated performance data of the neural network model implemented by the software system 300 of FIG. 3, with noise power equal to 0.2 of signal power. FIG. 6C illustrates an example histogram 640 of simulated performance data of the neural network model implemented by the software system 300 of FIG. 3, with noise power equal to 0.5 of signal power. For these simulations, the CSI is random, the number of UEs is eight, and the user group (maximum number of paired UEs) is fixed at four.

In FIG. 6A, the histogram 600 illustrates results from a number of simulations. The ratio of $C^A$ to $C^G$ is calculated, and is counted. The histogram 600 is a plot of the number of counts for particular ranges of the ratio of $C^A$ to $C^G$. In FIG. 6A, the histogram 600 illustrates a mean ratio of 0.97 and a maximum ratio of 1.01. In FIG. 6B, the histogram 640 illustrates a mean ratio of 1.01 and a maximum ratio of 1.82, generally at least outperforming the greedy algorithm. In FIG. 6C, the histogram 660 illustrates a mean ratio of 1.16 and a maximum ratio of 3.47, generally outperforming the greedy algorithm.

FIG. 7 illustrates an example table, Table 1, of simulated performance data of the neural network model implemented by software system 300 of FIG. 3. The ratio of $C^A$ to $C^G$ is calculated. In Table 1, the headings are number of users (e.g., number of UEs), dimensionality of the neural network for each attention mechanism 504 ($d_{model}$), and noise value of signal power. The table values in Table 1 are the mean ratio of $C^A$ to $C^G$ and, in parentheses, the maximum ratio.

Table 1 can be used to evaluate performance of the neural network model implemented by the software system 300 with respect to model dimensionality (dimension of each attention mechanism 504, affecting complexity). The models include i) model with $d_{model}$=64 and 263K parameters (weights), ii) model with $d_{model}$=128 and 638K parameters, and iii) model with $d_{model}$=256 and 1735K parameters. Table 1 shows that for 10 UEs the smaller model i) does not sacrifice any significant performance. For 20 UEs, however, there are cases where higher model dimensionality translates to higher performance, e.g. models ii) and iii) perform better compared to model i).

In the simulations of Table 1 the number of identical layers (N in FIG. 4) is fixed to 3 and the number of attention heads (h in FIG. 5) is fixed to 8. The number of feed-forward layers in the decoder 310 is set to 2, the dimension of each feed-forward layer is set equal to $d_{model}$, batch size is 128, and 5% of data is used for evaluation. The experiment is run 3 times and averages and maximum values are determined. Note that further reduction may be possible by tuning the number of attention heads and attention layers in the software system 300, and number and dimensionality of feed-forward layers in the decoder 310.

FIG. 8 illustrates another example table, Table 2, of simulated performance data of the neural network model implemented by the software system 300 of FIG. 3. The ratio of $C^A$ to $C^G$ is calculated. The table values in Table 2 are the mean ratio of $C^A$ to $C^G$ and, in parentheses, the maximum ratio. In Table 2, the headings are user count (e.g., number of UEs), weight precision, and noise value of signal power. Table 2 compares the performance of the ratio using 8 bits, 16 bits, and 32 bits. 32 bits is considered full precision of parameters (weights). From Table 2, it can be seen that the full precision (32 bits) model does not dominate the quantized model, and in fact the quantization acts as a regularizer and allows the quantized model to achieve better performance. The performance gap is very minimal for the 10 UE case, and more significant for 20 UEs.

In the simulations of Table 2 the number of identical layers (N in FIG. 4) is fixed to 3 and the number of attention heads (h in FIG. 5) is fixed to 8. The number of feed-forward layers in the decoder 310 is set to 2, the dimension of each feed-forward layer is set equal to $d_{model}$, batch size is 128, and 5% of data is used for evaluation. The model dimensionality (dimension of each attention mechanism 504, affecting complexity) is fixed at 64. The experiment is run 3 times and averages and maximum values are determined.

In example embodiment, it would be appreciated that examples of the neural network model implemented by the software system 300 can have high accuracy and short latency due to fully feed-forward connections. In some examples, generating of the output 316 from the input 302 (CSI matrix 318) can take less than 1 millisecond compared to 100 milliseconds of the greedy algorithm.

Example embodiments of the neural network model implemented by the software system 300 can accommodate input size-invariance of the input 302. In some examples, padding is used to the match the input 302 to desired dimensionality. In some examples, the dimensionality transforming by the input embedding module 304 is configured to automatically accommodate different input dimensions of the input 302 (CSI matrix 318).

It would be appreciated that example embodiments of the neural network model implemented by the software system 300 are modular and scaleable. A smaller architecture (an architecture with a small number of attention heads and a lower embedding dimensionality) can work well for wireless communication networks with low load, and larger architectures can be used for wireless communication networks with higher load and a large UE count.

Figure 9:
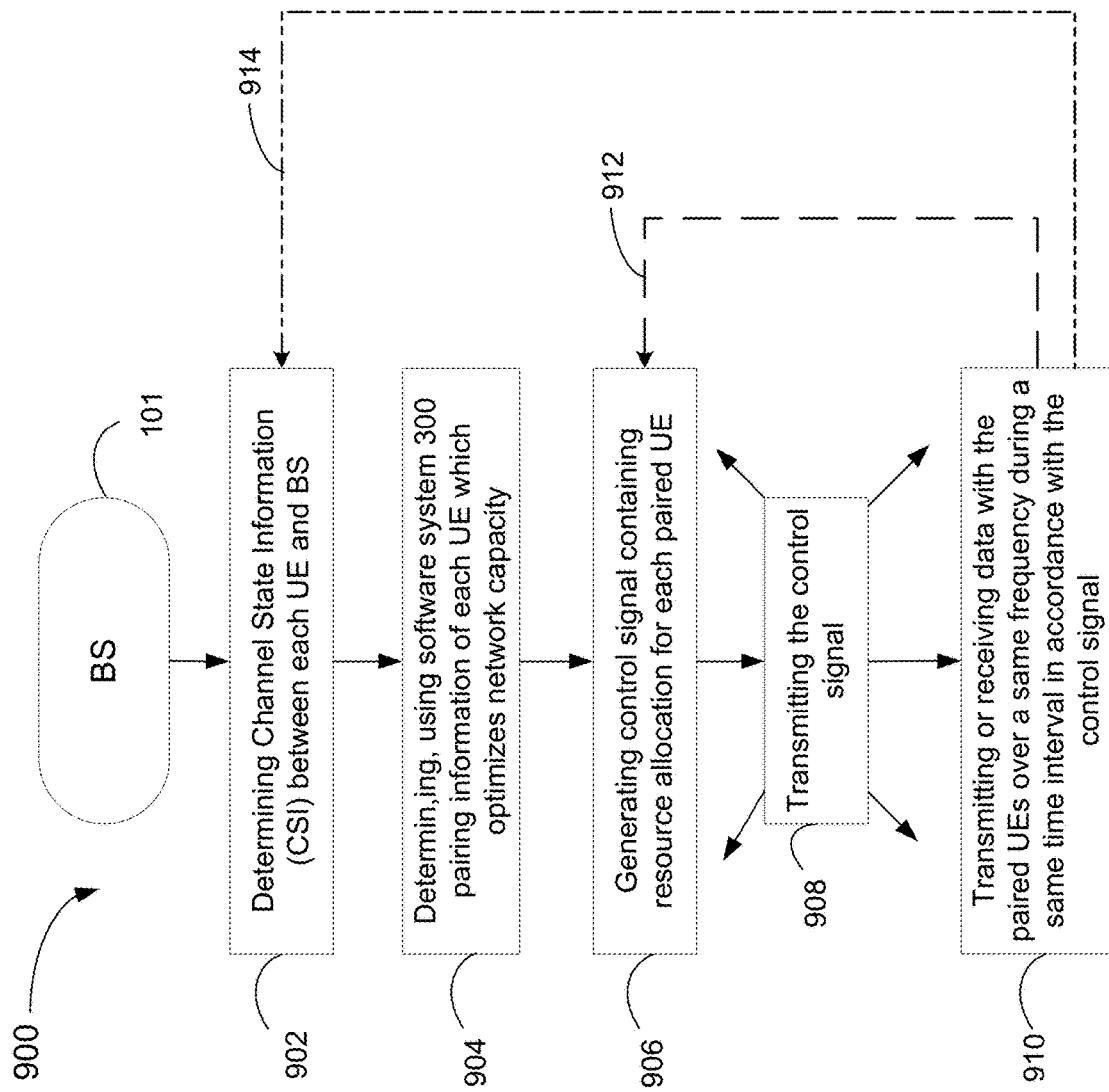
FIG. 9 illustrates an example method performed by a base station for performing wireless multi-user pairing of a plurality of UE, in accordance with an example embodiment; and Similar reference numerals may have been used in different figures to denote similar components.

FIG. 9 illustrates an example method 900 for performing wireless multi-user pairing of a plurality of UEs 102, in accordance with an example embodiment. At step 902, the BS 101 determines channel state information (CSI) between the BS 101 and each UE 102 in range and serviceable by the BS 101. For example, CSI can be determined by the BS 101 transmitting a sounding packet and receiving a response from each UE 102. In some examples, the CSI includes the CSI between each BS antenna and each UE 102. At step 904, the software system 300 described above determines pairing information of each UE 102 from the determined CSI between the BS 101 and each UE 102 which optimizes network capacity. The software system 300 receives an input comprising a sequence of vectors comprising the CSI between the BS 101 and each UE 102, transforms the input to an input embedding; and inputs the input embedding the neural network model, the neural network model configured to generate pairing information for each UE 102 based on the input embedding, the pairing information for each UE 102 indicative of whether the UE 102 is to share a frequency resource during a shared time interval. At step 906, the BS 101 generates a control signal containing resource allocation for each paired UE 102. The resource allocation can include frequency allocation (e.g. the frequency resource) and, in some examples, a time allocation (e.g. the TTI). As well, the BS 101 can determine which antenna is transmitting to which UE 102. At step 908, the BS 101 transmits the control signal to each UE 102. Step 908 can be transmitted by way of a beacon, or alternatively by way of end-to-end transmission to each individual UE 102. The control signal can be a stand-alone management frame in some examples. In other examples, the control signal is a management frame in a header or preamble in the same transmission as the data payload for a DL transmission. In some embodiments, the BS 100 selects or adjust air interface parameters based on the generated pairing information.

At step 910, the BS 101 transmits user data to and receives user data from the paired UEs 102 in accordance with the resource allocation. For example, for the paired UEs, the BS 101 transmits user data to or receives user data from the pair UEs using a same frequency resource during a same time interval in accordance with the resource allocation.

In some examples, at loop arrow 912, the BS 101 loops the method to step 906, once again generating the next control signal including resource allocation for the UEs 102 (re-using the previously-determined CSI), and then transmits the next control signal at step 908. In some examples, at loop arrow 914, the BS 101 loops the method to step 902, once again determining channel state information between each antenna of the BS 101 and each UE 102, in order for the BS 101 to determine the most current CSI at subsequent steps of the method 900.

Referring to FIG. 9 at step 906, in some examples, any unpaired UEs 102 will not be provided with any resource allocation as those unpaired UEs 102 not be communicating in the upcoming time interval.

In example embodiments, the BS 101 is configured to perform the functions of the software system 300 and the method 900. In other example embodiments, at least some or all of the functions of the software system 300 and the method 900 can be performed by a separate device. For example, the input 302 provided by the BS 101 to the separate device for processing, and the output 316 is provided from the separate device to the BS 101. Examples of the separate device include a virtual machine running on the cloud, or some other customer premise equipment.

Figure 2:
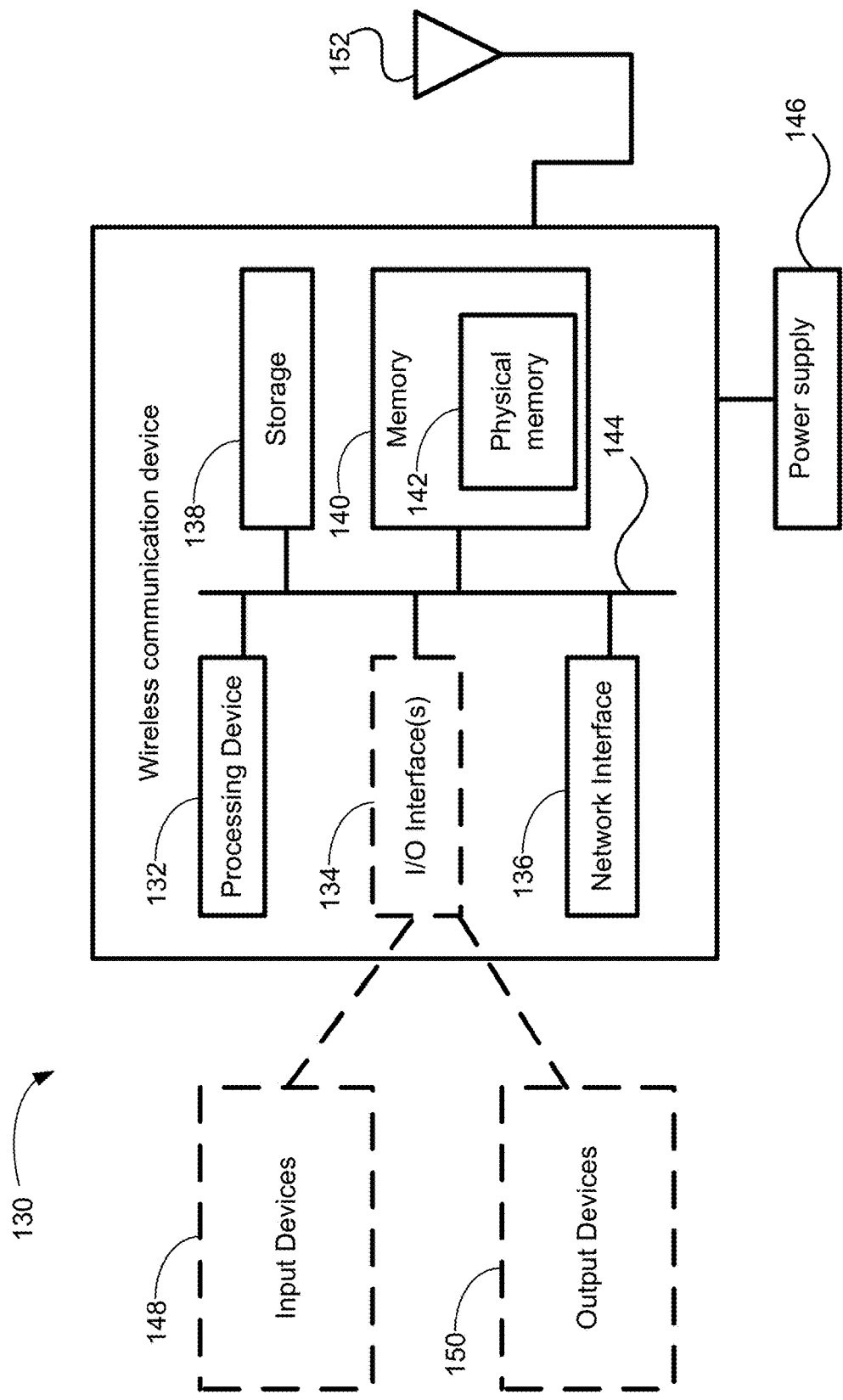
FIG. 2 is a schematic representation of an example wireless communication device according to an example embodiment.

FIG. 2 is a schematic diagram of an example wireless communication device 130, in accordance with example embodiments. For example, the wireless communication device 130 may be the BS 101 or the UE 102, and can wirelessly transmit and receive data. The wireless communication device 130 may be used for multiple access communications within the wireless communication network 100. Although FIG. 2 shows a single instance of each component, there may be multiple instances of each component in the wireless communication device 130 and the wireless communication device 130 could be implemented using parallel and distributed architecture. Some of the components in FIG. 2 are optional in some examples.

The wireless communication device 130 may include one or more processors 132, such as a controller, a microprocessor, an application-specific integrated circuit (ASIC), a field-programmable gate array (FPGA), a dedicated logic circuitry, or combinations thereof. The wireless communication device 130 may also include one or more optional input/output (I/O) interface(s) 134, which may enable interfacing with one or more optional input devices 148 and output devices 150. The wireless communication device 130 may include one or more network interfaces 136 for wired or wireless communication with a network (e.g., an intranet, the Internet, a Peer-to-Peer (P2P) network, a Wide Area Network (WAN), a wireless WAN (WWAN), a LAN, a wireless LAN (WLAN), or a Radio Access Network (RAN)) or other node. Wireless networks may make use of wireless connections transmitted over an antenna 152. The network interface(s) 136 may provide multiple access wireless communication via one or more transmitters or transmit antennas and one or more receivers or receive antennas, for example. In this example, one antenna 152 is shown for simplicity. In some examples the antenna 152 represents multiple antennas for transmitting and receiving. In some examples, an antenna array may be used. The wireless communication device 130 may also include one or more storage units 138, which may include a mass storage unit such as a solid state drive, a hard disk drive, a magnetic disk drive or an optical disk drive.

The wireless communication device 130 may include one or more non-transitory memories 140 that can include physical memory 142, which may include a volatile or non-volatile memory (e.g., a flash memory, a random access memory (RAM), or a read-only memory (ROM)). The memory 140 (as well as storage unit(s) 138) may store instructions for execution by the processor(s) 132, such as to carry out processing such as those described herein. The memory 140 may include other software instructions, such as for implementing an operating system (OS), and other applications/functions. In some examples, one or more data sets or modules may be provided by an external memory (e.g., an external drive in wired or wireless communication with the wireless communication device 130) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

In some examples, there may be a bus 144 providing communication among components of the wireless communication device 130. The bus 144 may be any suitable bus architecture including, for example, a memory bus, a peripheral bus or a video bus. Optional input device(s) 148 (e.g., a keyboard, a mouse, a microphone, a touchscreen, or a keypad) and optional output device(s) 150 (e.g., a display, a speaker or a printer) may be external to the wireless communication device 130, and connected to optional I/O interface(s) 134. In other examples, one or more of the input device(s) 148 or the output device(s) 150 may be included as a component of the wireless communication device 130.

When the wireless communication device 130 is the BS 101, the BS has more than one antenna 152 for communication with other devices (such as the UEs 102). The processor 132 may carry out the steps and functions described herein. When the wireless communication device 130 is a UE 102, communications with the BS 101 can be performed via one antenna 152 (other examples can include more than one antenna 152).

The wireless communication device 130 also includes a power supply block 146 to supply power to the wireless communication device 130. In some examples, the power supply block 146 can include a battery. In some examples, the power supply block 146 includes a power adapter (e.g., AC/DC or DC/DC) for connection to an external power source and can be used for charging the battery or for directly powering the wireless communication device 130.

In at least some examples, instructions that cause the processor 132 to carry out methods and processes in accordance with example embodiments are stored in storage unit(s) 138 or memory 140 of the wireless communication device 130. In some examples, the processor 132 may be one or more controllers, which may comprise a modulator or a processor. Example systems and methods described herein, in accordance with examples, can be implemented by the one or more controllers. The one or more controllers can comprise hardware, software, or a combination of hardware and software, depending on the particular component and function. In some examples, the one or more controllers can include analog or digital components, and can include one or more processors, one or more non-transitory storage mediums such as memory storing instructions executable by the one or more processors, one or more transceivers (or separate transmitters and receivers), one or more signal processors (analog or digital), and one or more analog circuit components.

In an alternate example of any of the described example embodiments, rather than network capacity being optimized by the software system 300, other suitable criteria that may be optimized include SINR, SNR, or signal to interference ratio.

An example embodiment is a machine including a processor and a memory which stores instructions that when executed by the processor causes the processor to perform any of the described methods, processes or algorithms. The machine may be a physical machines, such as a computer, a server, and the like, or a virtual machine instance provided by a distributed computing system or a cloud service provider.

An example embodiment is a user equipment, comprising at least one antenna; a processor; a memory which stores instructions that when executed by the processor causes the processor to perform any of the described methods, processes or functions.

An example embodiment is a non-transitory computer-readable medium which stores instructions that when executed by a processor causes the processor to perform any of the described methods, processes or algorithms.

The described example embodiments may be implemented by using software. Based on such understandings, the technical solution of some example embodiments may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the example embodiments. The software product may additionally include a number of instructions that enable a computer device to execute operations for configuring or programming a digital logic apparatus in accordance with example embodiments.

Example software systems described herein, in accordance with example embodiments, can be. The physical machines can comprise hardware, software, or a combination of hardware and software, depending on the particular application, component or function. In some example embodiments, the one or more physical machines can include one or more processors, one or more non-transitory storage mediums such as memory storing instructions executable by the one or more processors, one or more transceivers (or separate transmitters and receivers), one or more signal processors (analog and/or digital), and/or one or more analog circuit components.

In the described methods or block diagrams, the boxes may represent events, steps, functions, processes, modules, messages, and/or state-based operations, etc. Although some of the examples have been described as occurring in a particular order, it will be appreciated by persons skilled in the art that some of the steps or processes may be performed in a different order provided that the result of the changed order of any given step will not prevent or impair the occurrence of subsequent steps. Furthermore, some of the messages or steps may be removed or combined in other embodiments, and some of the messages or steps may be separated into a number of sub-messages or sub-steps in other embodiments. Even further, some or all of the steps may be repeated, as necessary. Elements described as methods or steps similarly apply to systems or subcomponents, and vice-versa. Reference to such words as "sending" or "receiving" could be interchanged depending on the perspective of the particular device.

The described embodiments are considered to be illustrative and not restrictive. Example embodiments described as methods would similarly apply to systems (and functions of the system), and vice-versa.

Variations may be made to some example embodiments, which may include combinations and sub-combinations of any of the described embodiments. The example embodiments presented are merely examples and are in no way meant to limit the scope of this disclosure. Variations of the innovations described herein will be apparent to persons of ordinary skill in the art, such variations being within the intended scope of the present disclosure. In particular, features from one or more of the described embodiments may be selected to create alternative embodiments comprised of a sub-combination of features which may not be explicitly described. In addition, features from one or more of the described embodiments may be selected and combined to create alternative embodiments comprised of a combination of features which may not be explicitly described. Features suitable for such combinations and sub-combinations would be readily apparent to persons skilled in the art upon review of the present disclosure as a whole. The subject matter described herein intends to include all suitable changes in technology.

The specification and drawings are, accordingly, to be regarded simply as an illustration, and are contemplated to cover any and all modifications, variations, combinations or equivalents.

What is claimed is:

1. A method for performing wireless multi-user pairing of a plurality of user equipment (UE) in a wireless communication network, the method comprising:
    receiving an input comprising a sequence of vectors of channel state information (CSI) between each UE of a plurality of UEs and a base station with a plurality of antennas in the wireless communication network;
    transforming the input to an input embedding; and
    inputting the input embedding to system implementing a neural network model, the neural network model configured to generate pairing information for each UE based on the input embedding, the pairing information for each UE indicative of whether the UE is to share a frequency resource during a shared time interval.

2. The method as claimed in claim 1, wherein the neural network model is trained using a training dataset comprising labeled data samples, wherein each labeled data is a <x, y> pair, with x representing a measured or simulated CSI between a UE of the plurality of UEs and the plurality of antennas of the base station and y representing the pairing information for the UE.

3. The method as claimed in claim 2, wherein the pairing information for the UE is generated using a greedy algorithm.

4. The method as claimed in claim 1, wherein the neural network model optimizes network capacity of the wireless communication network.

5. The method as claimed in claim 1, wherein the neural network model optimizes signal to interference plus noise ratio (SINK) or signal to noise ratio (SNR) of the wireless communication network.

6. The method as claimed in claim 1, wherein the neural network model further includes an encoder for transforming the input embedding to vectors in the latent space.

7. The method as claimed in claim 6, wherein the neural network model further includes a decoder that includes a feed forward neural network for transforming the vectors in the latent space to a decoder output.

8. The method as claimed in claim 7, wherein the neural network model further includes a transformation module for transforming the decoder output to a transformed output.

9. The method as claimed in claim 8, wherein the neural network model further includes a sigmoid module for transforming the transformed output to the pairing information, wherein the pairing information is a vector having binary values representative of being paired versus unpaired.

10. The method as claimed in claim 6, wherein the encoder includes a plurality of parallel attention mechanisms.

11. The method as claimed in claim 10, wherein the encoder is configured to concatenate collective output from each attention mechanism and transform the concatenated collective output for matching dimensionality of the vectors in the latent space.

12. The method as claimed in claim 6, wherein the transforming includes input embedding the input sequence to transform dimensionality of the input sequence to a dimensionality of the encoder.

13. The method as claimed in claim 6, wherein the latent space has a fixed dimensionality.

14. The method as claimed in claim 1, wherein the method is performed by a processor of the base station.

15. The method as claimed in claim 1, wherein the CSI includes CSI between each antenna of the BS and each UE.

16. A base station, comprising:
   a plurality of antennas;
   a processor; and
   a memory associated with the processor which stores instructions that when executed by the processor causes the processor to:
   receive an input comprising a sequence of vectors of channel state information (CSI) between each UE of a plurality of UEs and the plurality of antennas of the base station;
   transform the input to an input embedding; and
   input the input embedding to system implementing a neural network model, the neural network model configured to generate pairing information for each UE based on the input sequence, the pairing information for each UE indicative of whether the UE is to share a frequency resource during a shared time interval.

17. The device as claimed in claim 16, wherein the device is a base station comprising the plurality of antennas.

18. A non-transitory computer-readable medium which stores instructions that when executed by a processor causes the processor to perform multi-user pairing, the instructions comprising:
   instructions for receiving an input comprising a sequence of vectors of channel state information (CSI) between each UE of a plurality of UEs and a base station with a plurality of antennas in the wireless communication network;
   instructions for transforming the input to an input embedding; and
   instructions for inputting the input embedding to system implementing a neural network model, the neural network model configured to generate pairing information for each UE based on the input embedding, the pairing information for each UE indicative of whether the UE is to share a frequency resource during a shared time interval.

* * * * *